United States Patent
Usvyatsky et al.

(10) Patent No.: US 10,845,994 B1
(45) Date of Patent: Nov. 24, 2020

(54) PERFORMING RECONCILIATION ON A SEGMENTED DE-DUPLICATION INDEX

(71) Applicant: EMC IP Holding Company LLC, Hopkinton, MA (US)

(72) Inventors: Ilya Usvyatsky, Northborough, MA (US); Nickolay Alexandrovich Dalmatov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 332 days.

(21) Appl. No.: 15/664,185

(22) Filed: Jul. 31, 2017

(51) Int. Cl.
  *G06F 3/06* (2006.01)
  *G06F 16/13* (2019.01)

(52) U.S. Cl.
  CPC ........... *G06F 3/0608* (2013.01); *G06F 3/065* (2013.01); *G06F 3/0619* (2013.01); *G06F 3/0641* (2013.01); *G06F 3/0685* (2013.01); *G06F 16/137* (2019.01); *G06F 3/067* (2013.01)

(58) Field of Classification Search
  CPC ........... G06F 17/30156; G06F 17/3033; G06F 17/30336
  See application file for complete search history.

(56) References Cited

U.S. PATENT DOCUMENTS

| | | |
|---|---|---|
| 8,707,308 B1 | 4/2014 | Naamad et al. |
| 9,454,549 B1 | 9/2016 | Bachu et al. |
| 9,477,693 B1 | 10/2016 | Bachu et al. |
| 2012/0166401 A1* | 6/2012 | Li ..................... G06F 16/1748 707/692 |

* cited by examiner

*Primary Examiner* — Gary W. Cygiel
(74) *Attorney, Agent, or Firm* — BainwoodHuang

(57) ABSTRACT

A technique accesses a non-resident segment and a resident segment of a segmented de-duplication index, the resident segment being currently loaded into primary memory from secondary storage for data block de-duplication, and the non-resident segment not being currently loaded into the primary memory from the secondary storage for de-duplication. The technique further discovers that a digest of a non-resident digest entry of the non-resident segment and a digest of a resident digest entry of the resident segment are duplicates. The non-resident digest entry includes a first reference to a first location of the secondary storage that holds a first data block copy, and the resident digest entry includes a second reference to a second location of the secondary storage that holds a second data block copy. The technique further performs reconciliation that conforms the non-resident segment and the resident segment of the index to reference only data block copy.

20 Claims, 6 Drawing Sheets

400

Access a non-resident segment of a de-duplication index and a resident segment of the de-duplication index, the resident segment being currently loaded into primary memory from secondary storage for data block de-duplication, and the non-resident segment not being currently loaded into the primary memory from the secondary storage for data block de-duplication ⟶ 402

In response to accessing the non-resident segment and the resident segment, discovering that (i) a digest of a non-resident digest entry of the non-resident segment and (ii) a digest of a resident digest entry of the resident segment are duplicates, the non-resident digest entry including a first reference to a first storage location of the secondary storage that holds a first copy of a particular data block, and the resident digest entry including a second reference to a second storage location of the secondary storage that holds a second copy of the particular data block ⟶ 404

In response to discovering that (i) the digest of the non-resident digest entry of the non-resident segment and (ii) the digest of the resident digest entry of the resident segment are duplicates, perform a reconciliation operation that conforms the non-resident segment and the resident segment of the de-duplication index to reference only one of the first copy and the second copy of the particular data block ⟶ 406

US 10,845,994 B1

PERFORMING RECONCILIATION ON A SEGMENTED DE-DUPLICATION INDEX

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines, which specify files or other data elements to be written, read, created, deleted, etc. Software running on the storage processors manages incoming storage requests and performs various data processing tasks to organize and secure the data elements stored on the non-volatile storage devices. Filesystems are generally built upon volumes. In some data storage systems, slices of data storage may be provisioned to a volume that supports a filesystem on an as-needed basis. As is known, slices are uniformly-sized storage extents, which may be 256 megabytes (MB) or 1 gigabyte (GB), for example. When a filesystem requires additional storage space to accommodate incoming writes, a data storage system may provide the additional space by provisioning another slice to the volume that backs the filesystem. The filesystem subdivides these slices into data blocks which may be 4 kilobytes or 8 kilobytes, for example.

Some data storage systems employ a de-duplication feature so that identical blocks of data on two different volumes need not be physically stored on disk in two different locations. Rather, one volume includes a pointer to the location on disk where the other volume has stored the same data block.

SUMMARY

Unfortunately, the above-mentioned systems suffer some deficiencies. For example, in order to keep track of which blocks have already been stored in a manner that allows incoming blocks to be easily compared for de-duplication, an index may be used. However, data storage systems with large amounts of data subject to de-duplication, the index can easily exceed the memory limitations of the data storage system. Thus, it is not possible to keep the entire index in memory at once. It may be possible to search the index on disk, but this is too slow for real-time de-duplication of data upon ingest.

Thus, it would be desirable to implement de-duplication that allows for real-time reference to an index that is too large to fit within memory. This may be accomplished by segmenting the index into smaller segments, stored on disk. Only a subset of the segments may be loaded into memory at a given time. A predictive filter is stored in memory for each segment, allowing the de-duplication driver to quickly predict whether any given block is likely to be indexed by each segment. Since identical blocks are often stored in long identical sequences (e.g., upon copying a disk image to a disk for a virtual machine), once a segment stored on disk is referenced many times in a short period, it is loaded into memory to allow the remainder of the long sequence to be de-duplicated. In some embodiments, a Bloom filter is used.

In the context of a de-duplication environment which utilizes a segmented de-duplication index, it is possible for different segments to reference different copies of the same data block. For example, it is possible for the de-duplication index to include a first segment that references a first copy of a particular data block and a second segment that references a second copy of the particular data block. Accordingly, reconciliation is performed to conform these different segments to reference just one of the first copy and the second copy of the particular data block.

One embodiment is directed to a method, performed within data storage equipment, of managing a de-duplication index having segments containing digest entries that reference data blocks residing within secondary storage. The method includes accessing a non-resident segment of the de-duplication index and a resident segment of the de-duplication index, the resident segment being currently loaded into primary memory from the secondary storage for data block de-duplication, and the non-resident segment not being currently loaded into the primary memory from the secondary storage for data block de-duplication. The method further includes, in response to accessing the non-resident segment and the resident segment, discovering that (i) a digest of a non-resident digest entry of the non-resident segment and (ii) a digest of a resident digest entry of the resident segment are duplicates, the non-resident digest entry including a first reference to a first storage location of the secondary storage that holds a first copy of a particular data block, and the resident digest entry including a second reference to a second storage location of the secondary storage that holds a second copy of the particular data block. The method further includes, in response to discovering that (i) the digest of the non-resident digest entry of the non-resident segment and (ii) the digest of the resident digest entry of the resident segment are duplicates, performing a reconciliation operation that conforms the non-resident segment and the resident segment of the de-duplication index to reference only one of the first copy and the second copy of the particular data block.

In some arrangements, performing the reconciliation operation includes, from the de-duplication index, eliminating one of the first reference to the first storage location of the secondary storage and the second reference to the second storage location of the secondary storage. To this end, a resident segment evaluation operation maybe performed prior to performing the reconciliation operation to determine whether the resident segment is open to receiving new digest entries or not open to receiving new digest entries.

In some arrangements, eliminating includes deleting the resident digest entry from the resident segment when a result of the resident segment evaluation operation indicates that the resident segment is open to receiving new digest entries. Alternatively, eliminating includes replacing, within the non-resident digest entry, the first reference to the first storage location with the second reference to the second storage location when the result of the resident segment evaluation operation indicates that the resident segment is not open to receiving new digest entries.

In some arrangements, discovering includes performing a comparison operation between the digest of a non-resident digest entry of the non-resident segment and the digest of a resident digest entry of the resident segment to determine whether the digests are duplicates. Along these lines, the method may further includes, prior to performing the comparison operation between the digest of the non-resident digest entry of the non-resident segment and the digest of the resident digest entry of the resident segment, filtering the digest of the non-resident digest entry against a predictive filter to predict whether the resident segment indexes a copy of the particular data block.

In some arrangements, (i) the digest of the non-resident digest entry of the non-resident segment and (ii) the digests of resident digest entries of multiple resident segments are discovered to be duplicates. In these arrangements, performing the reconciliation operation includes:

(A) choosing, as the resident segment, a particular segment from among the multiple resident segments of the deduplication index, and (B) in response to choosing the particular segment from among the multiple resident segments of the deduplication index, conforming the non-resident segment and the particular segment of the deduplication index to reference only one of the first copy and the second copy of the particular data block.

Along these lines, choosing the particular segment may include performing a stream pattern detection operation that selects the particular segment from among the multiple resident segments of the deduplication index.

In some arrangements, the data storage equipment is operative to perform data storage operations to write data to and read data from the secondary storage via datasets. In these arrangements, the method further includes performing a de-duplication operation that shares one of the first copy and the second copy of the particular data block among different datasets.

In some arrangements, initially a first dataset includes the first reference to the first storage location of the secondary storage that holds the first copy of the particular data block. Additionally, initially a second dataset includes the second reference to the second storage location of the secondary storage that holds the second copy of the particular data block. Furthermore, performing the de-duplication operation includes accessing a back reference of the first copy of the particular data block to identify the first dataset among the dataset, and upon identifying the first dataset, replacing the first reference with the second reference within the first dataset to share the second copy of the particular data block among both the first dataset and the second dataset.

In some arrangements, performing the de-duplication operation further includes, in response to replacing the first reference with the second reference within the first dataset, deleting the first copy of the particular data block from the secondary storage to reclaim memory space within the secondary storage.

In some arrangements, the method further includes, in response to replacing the first reference with the second reference within the first dataset, leaving the first copy of the particular data block in place until the first copy of the particular data block is rewritten with new dataset content.

In some arrangements, the method further includes, in response to replacing the first reference with the second reference within the first dataset, leaving the first copy of the particular data block in place until the first copy of the particular data block is deleted in response to dataset deletion.

Another embodiment is directed to data storage equipment which includes memory, and control circuitry coupled to the memory. The memory stores instructions which, when carried out by the control circuitry, cause the control circuitry to:

(A) access a non-resident segment of a de-duplication index and a resident segment of the de-duplication index, the resident segment being currently loaded into primary storage from secondary storage for data block de-duplication, and the non-resident segment not being currently loaded into the primary storage from the secondary storage for data block de-duplication, (B) in response to accessing the non-resident segment and the resident segment, discover that (i) a digest of a non-resident digest entry of the non-resident segment and (ii) a digest of a resident digest entry of the resident segment are duplicates, the non-resident digest entry including a first reference to a first storage location of the secondary storage that holds a first copy of a particular data block, and the resident digest entry including a second reference to a second storage location of the secondary storage that holds a second copy of the particular data block, and (C) in response to discovering that (i) the digest of the non-resident digest entry of the non-resident segment and (ii) the digest of the resident digest entry of the resident segment are duplicates, perform a reconciliation operation that conforms the non-resident segment and the resident segment of the de-duplication index to reference only one of the first copy and the second copy of the particular data block.

Yet another embodiment is directed to a computer program product having a non-transitory computer readable medium which stores a set of instructions to manage a de-duplication index having segments containing digest entries that reference data blocks residing within secondary storage. The set of instructions, when carried out by computerized circuitry, causing the computerized circuitry to perform a method of:

(A) accessing a non-resident segment of the de-duplication index and a resident segment of the de-duplication index, the resident segment being currently loaded into primary storage from the secondary storage for data block de-duplication, and the non-resident segment not being currently loaded into the primary storage from the secondary storage for data block de-duplication;

(B) in response to accessing the non-resident segment and the resident segment, discovering that (i) a digest of a non-resident digest entry of the non-resident segment and (ii) a digest of a resident digest entry of the resident segment are duplicates, the non-resident digest entry including a first reference to a first storage location of the secondary storage that holds a first copy of a particular data block, and the resident digest entry including a second reference to a second storage location of the secondary storage that holds a second copy of the particular data block; and (C) in response to discovering that (i) the digest of the non-resident digest entry of the non-resident segment and (ii) the digest of the resident digest entry of the resident segment are duplicates, performing a reconciliation operation that conforms the non-resident segment and the resident segment of the de-duplication index to reference only one of the first copy and the second copy of the particular data block.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in performing reconciliation to conform different segments of a de-duplication index to reference just one of a first copy and a second copy of a particular data block.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

An improved technique is directed to performing reconciliation on segments of a segmented de-duplication index to conform different index segments to reference just one of a first copy and a second copy of a particular data block. Such a technique make take place within a data storage system that performs data storage operations on behalf of one or more host computers.

Embodiments will now be described. It is understood that such embodiments are provided by way of example to illustrate various features and principles, and that the invention hereof may be broader than the specific example embodiments disclosed.

Embodiments are directed to storing data in a de-duplicated manner on a data storage system in a manner that allows for real-time reference to an index that is too large to fit within memory. This may be accomplished by segmenting the index into smaller segments, stored on disk. Only a subset of the segments may be loaded into memory at a given time. A predictive filter is stored in memory for each segment, allowing the de-duplication driver to quickly predict whether any given block is likely to be indexed by each segment. Since identical blocks are often stored in long identical sequences (e.g., upon copying a disk image to a disk for a virtual machine), once a segment stored on disk is referenced many times in a short period, it is loaded into memory to allow the remainder of the long sequence to be de-duplicated. In some embodiments, a Bloom filter is used.

Details

Figure 1:
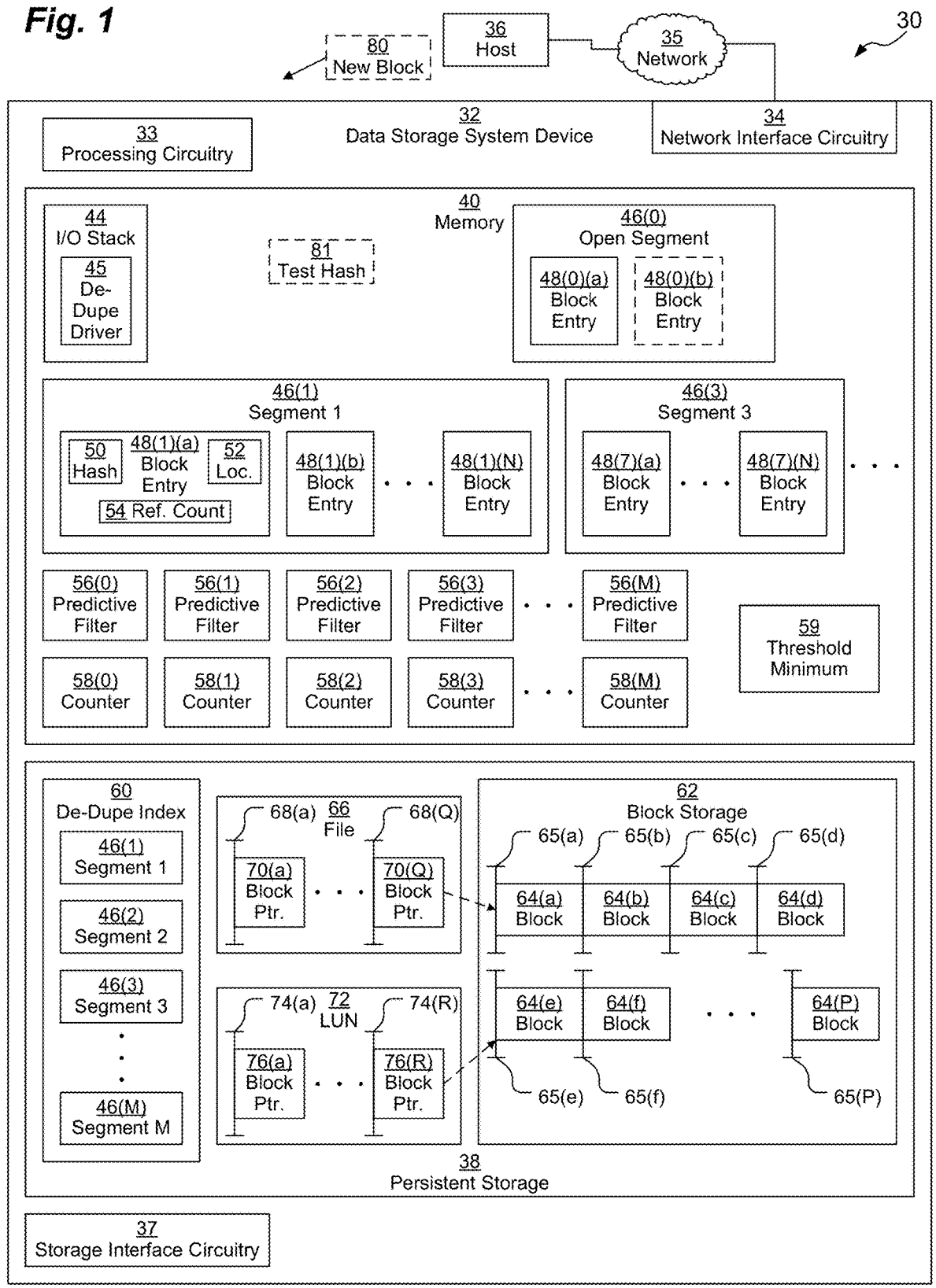
FIG. 1 is a block diagram depicting an example system and apparatus for use in connection with various embodiments.

FIG. 1 shows an example environment 30 in which embodiments of the improved techniques hereof can be practiced. Here, one or more host computing devices 36 access a data storage system (DSS) (e.g., a device or equipment) 32 over a network 35. The data storage system 32 includes processing circuitry 33, network interface circuitry 34, memory 40, storage interface circuitry 37, and a set of storage drives (not depicted) that provide persistent storage 38. DSS device 32 may also include other components, such as, for example, a chassis and interconnection circuitry.

In an example, the storage drives of persistent storage 38 may be arranged into one or more RAID groups (not depicted) where each RAID group is composed of multiple storage drives. The storage drives may include magnetic disk drives, electronic flash drives, optical drives, and/or other types of persistent storage.

The network 35 may be any type of network or combination of networks, such as a storage area network (SAN), a local area network (LAN), a wide area network (WAN), the Internet, and/or some other type of network or combination of networks, for example. The hosts 36 may connect to the DSS device 32 using various technologies, such as Fibre Channel, iSCSI, NFS, SMB 3.0, and CIFS, for example. Any number of hosts 36 may be provided, using any of the above protocols, some subset thereof, or other protocols besides those shown. The DSS device 32 is configured to receive I/O (input/output) requests (not depicted) according to standardized protocols and to respond to such I/O requests by reading or writing to the persistent storage 38 and providing an I/O response (not depicted) back to the initiating host 36.

Network interface circuitry 34 is configured to connect to network 35. Network interface circuitry 34 may include, for example, a SCSI target adapter or network interface adapters for converting electronic and/or optical signals received over the network 35 to electronic form for use by processing circuitry 33.

Processing circuitry 33 may be any kind of processor or set of processors configured to perform operations, such as, for example, one or more microprocessors, multi-core microprocessors, digital signal processors, systems on a chip, collections of electronic circuits, similar kinds of controllers, or any combination of the above.

The storage interface circuitry 37 may include, for example, SCSI adapters and other disk interface adapters (e.g., SAS, ATA, SATA, Fibre Channel, etc.) for communicating between the persistent storage 38 and the processing circuitry 33 or memory 40.

The DSS device 32 may include multiple storage processors (not depicted). Each storage processor may include its own instance of the processing circuitry 33, network interface circuitry 34, storage interface circuitry 37, and memory 40. Multiple storage processors may be provided as circuit board assemblies, or "blades," which plug into a chassis, which encloses and cools the storage processors. The chassis has a backplane for interconnecting the storage processors, and additional connections may be made among storage processors using cables. It is understood, however, that no particular hardware configuration is required, as any number of storage processors, including a single storage processor, may be provided and the storage processor can be any type of computing device capable of processing host I/Os.

Memory 40 may be any kind of digital system memory, such as, for example, random access memory (RAM). Memory 40 stores one or more operating systems (not depicted) in operation (e.g., Linux, UNIX, Windows, MacOS, or a similar operating system), an I/O driver stack 44 (which includes a de-duplication driver 45) executing on processing circuitry 33 and various associated data structures. Memory 40 may also store various other applications (not depicted) executing on processing circuitry 33.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage 38 is configured to store programs and data even while the DSS device 32 is powered off. The operating system and the applications and drivers are typically stored in this persistent storage portion of memory 40 or in persistent storage 38 so that they may be loaded into a system portion of memory 40 from this persistent storage portion of memory 40 or persistent storage 38 upon a system restart. These applications and drivers, when stored in non-transient form either in the volatile portion of memory 40 or in persistent storage 38 or in persistent portion of memory 40, form a computer program product. The processing circuitry 33 running one or more of these applications or drivers thus forms a specialized circuit constructed and arranged to carry out the various processes described herein.

Persistent storage 38 is arranged to include block storage 62 for storing data blocks 64 (depicted as data blocks 64(*a*), 64(*b*), 64(*c*), 64(*d*), 64(*e*), 64(*f*), . . . , 64(P)) that back one or more logical disks (LUNs) 72 or filesystems (not depicted) that rest thereupon. Persistent storage 38 also stores at least one LUN 72, at least one file 66 (which may include file metadata as well as a set of pointers 70, whether in an inode or indirect blocks of the file 66), and a de-duplication index 60. Each provisioned address 74 of LUN 72 is backed by a block 64 from block storage 62. Thus, for example, as depicted in FIG. 1, block pointer 76(R) at logical address 74(R) of LUN 72 is backed by block 64(*e*).

De-duplication index 60 includes a plurality of segments 46 (depicted as segments 46(1), 46(2), 46(3), . . . , 46(M)). Each segment 46 stores indexing information for various blocks 64 in block storage 62.

Memory 40 also stores some (but not all) of the segments 46 from persistent storage 38. As depicted, memory 40 store segments 46(1), 46(3), etc., but not segment 46(2). Memory 40 also stores an open segment 46(0), a set of predictive filters 56 (depicted as predictive filters 56(0), 56(1), 56(2), 56(3), . . . , 56(M))—one for each segment 46 in de-duplication index 60 as well as the open segment 46(0)—, a set of counters 58 (depicted as counters 58(0), 58(1), 58(2), 58(3), . . . , 58(M))—one for each segment 46 in de-duplication index 60 as well as the open segment 46(0)—, and a threshold minimum 59.

Each segment 46 includes a set of block entries 48. A typical segment 46(X) (except for the open segment 46(0)) includes exactly N block entries 48(X)(1)-48(X)(N). In one embodiment, each block entry 48 is sixty-four bytes long, and each segment 46 is sixty-four megabytes long, so N is 1,048,576. In other embodiments, other sizes for block entries 48 and segments 46 may be used (e.g., in some embodiments, the size of a segment 46 may be sixty-four megabytes, 128 megabytes, 256 megabytes, or 512 megabytes).

In some embodiments, as depicted in the context of block entry 48(1)(*a*) in FIG. 1, each block entry 48 includes a hash (or digest) 50, a location pointer 52, and a reference count 54. Each block entry 48 corresponds uniquely to a given block 64 as stored on persistent storage 38. A hash 50 is used to uniquely identify a block 64 within block storage 62. A pre-determined hashing function (not depicted) is used to generate each hash 50. In one embodiment, each hash 50 may be eighteen bytes in length, which is virtually guaranteed to avoid having the same hash 50 for two different blocks 64. For example, if block storage 62 can store 15 petabytes of unique data blocks 64, and each block 64 is 8 kilobytes long, then the chance of a hash collision with an 18-byte hash 50 is on the order of 1 in $10^{30}$.

Location pointer 52 points to an address 65 within block storage 38 where the block 64 hashed by hash 50 is stored. In one embodiment, location pointer 52 is six bytes long. Each block 64(Y) within block storage 62 has a unique address 65(Y) so that it can be located precisely. Reference count 54 is used to count how many logical addresses 68, 74 on LUNs 72 or files 66 point to the block 64(Y) at address 65(Y) pointed to by location pointer 52.

Open segment 46(0) contains block entries 48(0) (e.g., 48(0)(*a*)) that have recently been added. Open segment 46(0) always contains fewer than N block entries 48(0). Once the Nth block entry 48(0)(N) is added to open segment 46(0), open segment 46(0) closes and is flushed to disk, becoming a closed segment 46 that is part of de-duplication index 60, at which point a new open segment 46(0) is started.

During operation, when a new data block 80 comes in as part of a write command, as the write command passes down the I/O driver stack 44, de-duplication driver 45 intercepts the write command and performs de-duplication. De-duplication driver 45 hashes the new block 80 to yield test hash 81 and checks whether or not that test hash 81 is likely to be included within any of the block entries 48 of any segment 46. It does this by applying each predictive filter 56 to test hash 81 in turn. If test hash 81 is likely to appear within segment 46(X), then when predictive filter 56(X) is applied to test hash 81, it will yield an affirmative result. In one embodiment, each predictive filter 56 is a Bloom filter, as is well-known in the art, so when predictive filter 56(X) is applied to test hash 81, a negative result means that test hash 81 definitively does not appear within segment 46(X), but an affirmative result means that test hash 81 may or may not appear within segment 46(X). If the test hash 81 does not already appear in any segment 46 stored within memory 40, then de-duplication driver 45 causes block 80 to be written to a previously unused block 64(Y) within block storage 62 and it adds a new entry 48 (e.g., block entry 48(0)(*b*)) to open segment that points to that block 64(Y). Otherwise de-duplication driver 45 causes the write command to complete by updating a block pointer 68, 74 to point to a block 64(Y) in block storage 62 that already stored identical data to new block 80 as identified by a block entry 48 from a segment 46 stored within memory 40.

Every time a test hash (or digest) 81 is applied against a predictive filter 56(X), the associated counter 58(X) is updated based on whether the application resulted in an affirmative or negative result. For example, in one embodiment, de-duplication driver 45 decrements counter 58(X) for every negative result and increments it for every affirmative result. Segments 46(X) having the highest-valued respective counters 58(X) are stored within memory 40, while segments 46(X) having lower-valued respective counters 58(X) are not stored within memory 40, but only within persistent storage 38. In one embodiment, memory 40 stores the one hundred segments 46(X) having the highest respective counters 58(X).

In some embodiments, if a counter 58(X) drops below a threshold minimum value 59, then the data blocks 64 it indexes may be considered so unpopular that they are unlikely to ever be needed again for de-duplication purposes. Thus, the respective segments 46(X) and predictive filters 56(X) for those very low-valued counters 58(X) may be entirely deleted from both memory 40 and persistent storage 38.

Figure 2:
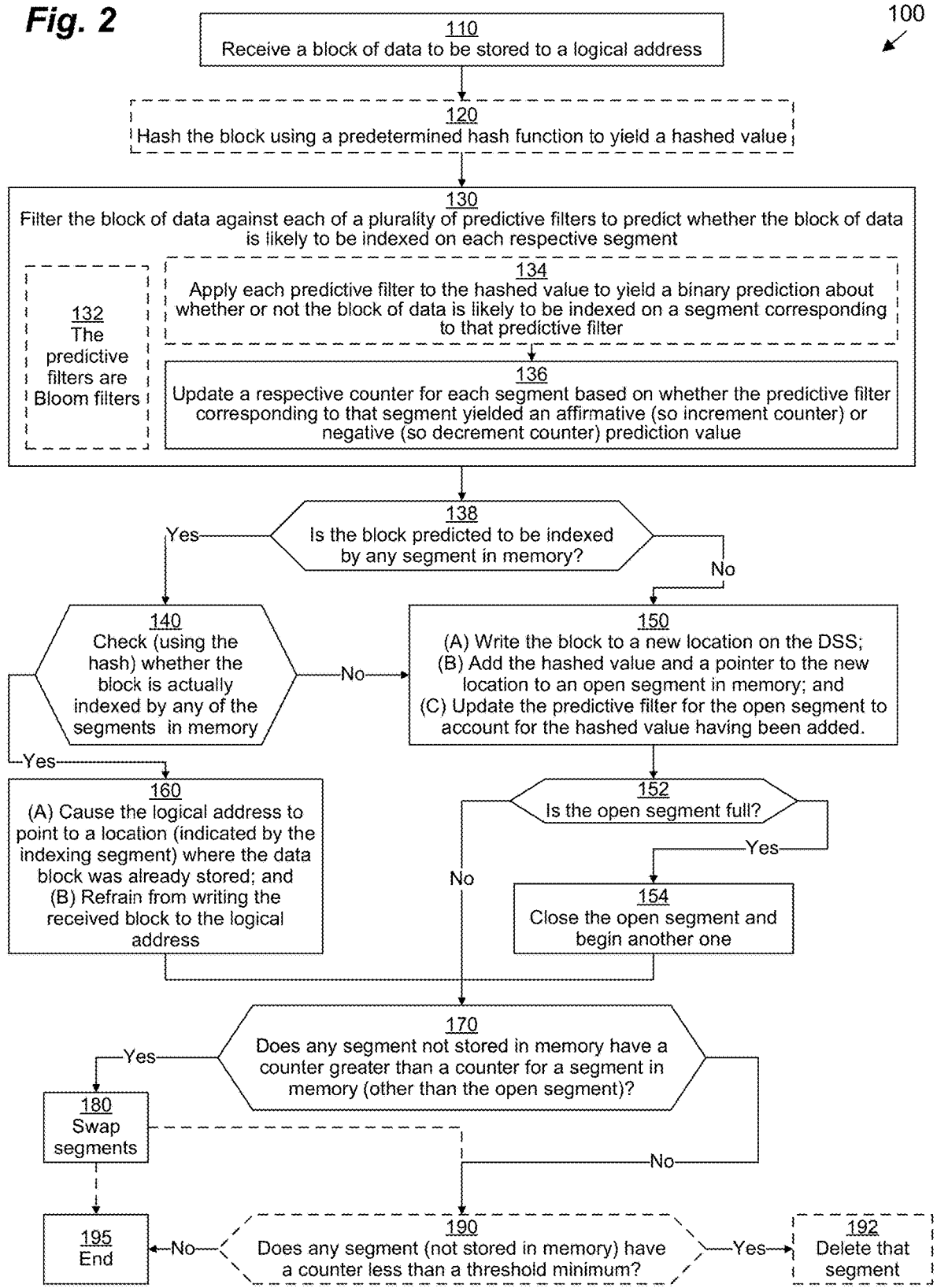
FIG. 2 is a flowchart depicting example methods of various embodiments.

FIG. 2 illustrates an example method 100 performed by de-duplication driver 45 of driver stack 44 for storing data in a de-duplicated manner on DSS device 32 in a manner that allows for real-time reference to an index 60 that is too large to fit within memory 40. It should be understood that any time a piece of software (e.g., I/O stack 44, de-duplication driver 45, etc.) is described as performing a method, process, step, or function, in actuality what is meant is that a computing device (e.g., DSS device 32) on which that piece of software is running performs the method, process, step, or function when executing that piece of software on its processing circuitry 33.

It should be understood that, within FIG. 2, certain steps and sub-steps are drawn with a dashed border because they may be considered optional, depending on the embodiment, or they may represent various alternative scenarios in which method 100 may be employed. In addition, one or more of the other steps or sub-steps of method 100 may also be omitted in some embodiments. Similarly, in some embodiments, one or more steps or sub-steps may be combined together or performed in a different order. Method 100 is performed by DSS device 32. More specifically, method 100 is performed by de-duplication driver 45 running on DSS device 32 in combination with other components of DSS device 32.

In step 110, de-duplication driver 45 receives a new data block 80 to be stored to a logical address 68, 74 on DSS device 32.

In some embodiments, de-duplication driver 45 then performs optional step 120. In step 120, de-duplication driver 45 hashes (or derives a digest algorithmically) the new block 80 using a predetermined hashing function to yield test hash value 81.

In step 130, de-duplication driver 45 filters the new block 80 against each of a plurality of predictive filters 56 to predict whether the new block 80 is likely to be indexed on each respective segment 46. In some embodiments, sub-step 132 indicates that the predictive filters 56 are Bloom filters.

In embodiments in which step 120 was performed, step 130 may be performed by performing sub-step 134. In sub-step 134, de-duplication driver 45 applies each of the plurality of predictive filters 56 to test hash 81 to yield a set of binary predictions about whether the new block 80 is likely to be indexed on each respective segment 46.

Step 130 also includes sub-step 136. In sub-step 136, de-duplication driver 45 updates a respective counter 58 for each segment 46 based on whether the predictive filter 56 corresponding to that segment 46 yielded an affirmative or negative prediction value.

In one embodiment, when predictive filter 56(X) yields an affirmative prediction value upon application to test hash 81, de-duplication driver 45 increments the value of counter 58(X), and when predictive filter 56(X) yields a negative prediction value upon application to test hash 81, de-duplication driver 45 decrements the value of counter 58(X).

Then, in step 138, de-duplication driver 45 determines whether or not predictive filters 56 for any segments 46 stored within memory 40 yielded an affirmative result. If so, operation proceeds with step 140. Otherwise, operation proceeds with step 150.

In step 140, since at least one segment 46 stored within memory 40 has been predicted to index the new block 80, de-duplication driver 45 checks the segments 46 stored within memory 40 which were predicted to index the new block 80 to see if any particular segment 46(X) actually includes test hash 81 as a hash 50 within any of its block entries 48(X)(a-N). However, since the predictive filters 56 are only probabilistic, it is possible that some of the predictions were affirmative even though none of the segments 46 stored within memory 40 actually store test hash 81. In some embodiments, de-duplication driver 45 checks the segments 46 within memory 40 having the affirmative results sequentially only until a particular segment 46(X) is found which actually includes test hash 81 as a hash 50 within any of its block entries 48(X)(a-N). If a particular segment 46(X) is found satisfying this condition, then operation proceeds with step 160. Otherwise, operation proceeds with step 150.

In step 160, since a particular segment 46(X) within memory 40 already indexes the new block 80, de-duplication driver 45 is able to arrange it such that driver stack 46 refrains from writing the new block 80 to any block 64 on persistent storage 38. Rather, de-duplication driver 45 causes a pointer 70, 76 at the logical address 68, 74 to which the new block 80 was supposed to be stored to point to (or be backed by) a block 64(Y) pointed to by location pointer 52 of a block entry 48(X)(Z) within the particular segment 46(X) for which the hash 50 is the same as test hash 81.

Alternatively, in step 150, since no particular segment 46(X) within memory 40 already indexes the new block 80, de-duplication driver 45 (A) writes the new block 80 to a new address 65(Y) on the block storage 62 as block 64(Y), (B) creates a new block entry 48(0)(b) on open segment 46(0) with the test hash 81 as its hash 50 and a pointer to the new address 65(Y) as its location pointer 52, and (C) updates the predictive filter 56(0) for the open segment 46(0) to account for the new block entry 48(0)(b) with its hash 50. Reference count 54 for new block entry 48(0)(b) may be initialized to a value of one.

Since a new block entry 48(0)(b) was added to the open segment 46(0) in step 150, operation proceeds with step 152 in which de-duplication driver 45 determines whether open segment 46(0) is now full (i.e., if it now contains N block entries 48(0)(a-N). If so, operation proceeds with step 154. Otherwise, operation proceeds with step 170. In step 154, de-duplication driver 45 closes the open segment 46(0), causing it to be stored to persistent storage 38 as part of the de-duplication index 40 (although it also may remain cached in memory 40). De-duplication driver 45 may also start a new open segment 46(0).

Operation proceeds with step 170 after steps 154 and 160 (and upon a negative result in step 152). In step 170, de-duplication driver 45 determines whether or not any segment 46(S) that is not stored within memory 40 has a respective counter 58(S) with a larger value than any counter 58(T) of a segment 46(T) within memory 40 (excluding the open segment 46(0) which may not be swapped out of memory 40 as long as it remains open). If so, operation proceeds with step 180. Otherwise, in some embodiments, operation proceeds with optional step 190, while, in other embodiments, operation may proceed with step 195, in which method 100 terminates.

In step 180, de-duplication driver 45 swaps segment 46(S) into memory 40 while segment 46(T) having a smaller-valued counter 58(T) is swapped out of memory 40 so that it is now only stored on persistent storage 38 rather than also being stored within memory 40. Then, in some embodiments, operation proceeds with optional step 190, while, in other embodiments, operation may proceed with step 195, in which method 100 terminates.

In optional step 190, in some embodiments, de-duplication driver 45 determines whether or not any segment 46(X) has a respective counter 58(X) with a value less than the threshold minimum value 59. De-duplication driver 45 may limit step 190 to only examining the counters 58 for segments 46 that are not stored in memory 40. If such a segment 46(X) with a small-valued counter 58(X) is found, operation proceeds with step 192, in which de-duplication driver 45 deletes that segment 46(X) from persistent storage 38 and then terminates method 100. Otherwise, operation may anyway proceed with step 195, in which method 100 terminates.

Thus, techniques have been provided for storing data in a de-duplicated manner on a DSS device 32 in a manner that allows for real-time reference to an index 60 that is too large to fit within memory 40. This may be accomplished by segmenting the index 60 into smaller segments 46, stored on persistent storage 38. Only a subset (e.g., one hundred out of perhaps one million) of the segments 46 may be loaded into memory 40 at a given time. A predictive filter 56 is stored in memory 40 for each segment 46, allowing the de-duplication driver 45 to quickly predict whether any given new block 80 is likely to be indexed by each segment 46. Since identical blocks 64 are often stored in long identical sequences (e.g., upon copying a disk image to a disk for a virtual machine), once a segment 46 stored on persistent storage 38 is referenced many times in a short period, it is loaded into memory 40 to allow the remainder of the long sequence to be de-duplicated. In some embodiments, a Bloom filter is used.

Reconciliation

In the context of a de-duplication environment 300 which utilizes a segmented de-duplication index (also see the data storage system 32 in FIG. 1), it is possible for different index segments to reference different copies of the same data block. For example, it is possible for the de-duplication index to include a first segment that references a first copy of a particular data block and a second segment that references a second copy of the particular data block. Accordingly, reconciliation is performed to conform these different segments to reference just one of the first copy and the second copy of the particular data block.

Figure 3:
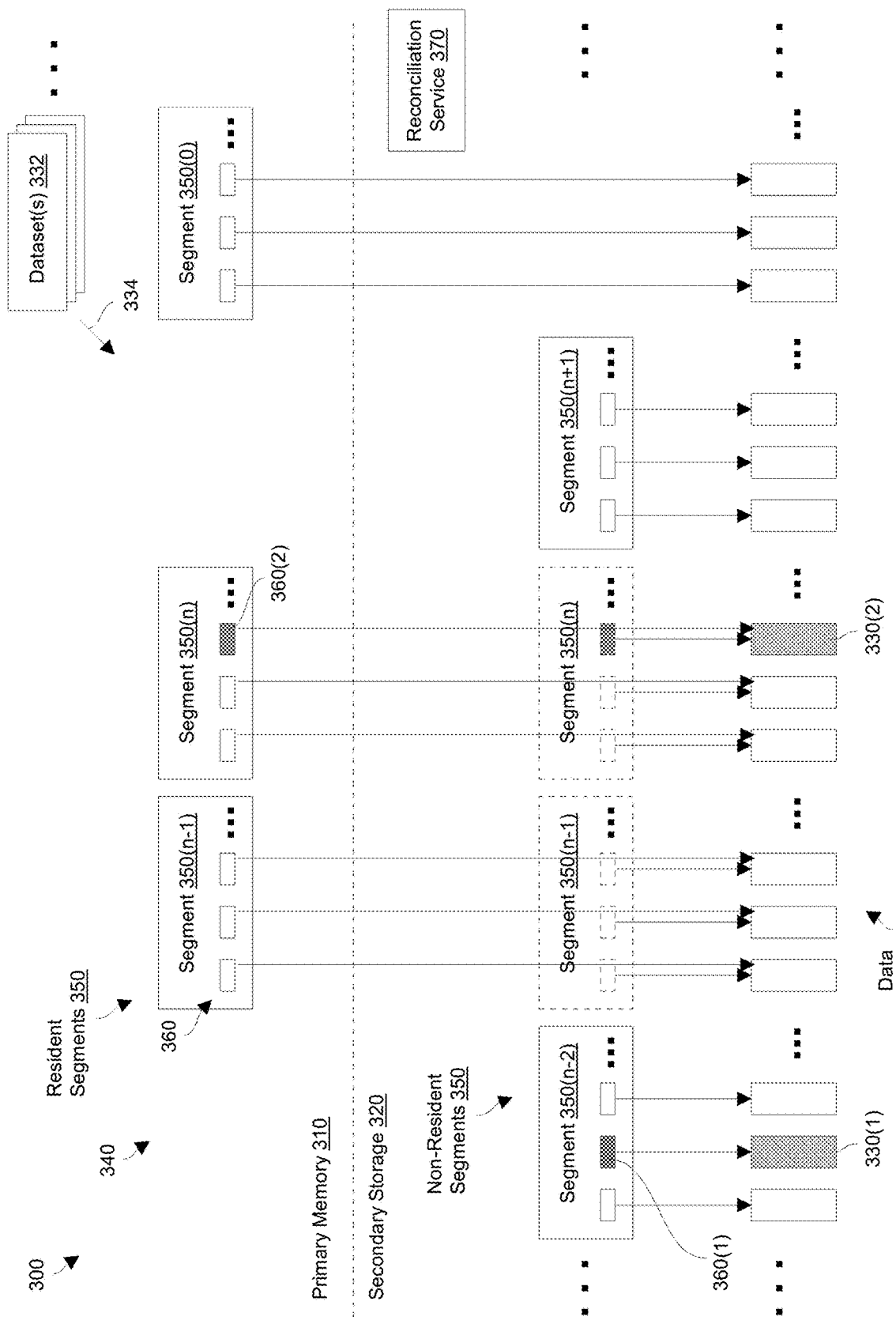
FIG. 3 is a block diagram of particular de-duplication index details in accordance with certain embodiments.

FIG. 3 shows particular de-duplication index details within a de-duplication environment 300 in accordance with certain embodiments. The de-duplication environment 300 includes primary memory 310 which is positioned closest to the processing circuitry (e.g., also see the memory 40 and the processing circuitry 33 of FIG. 1) and secondary storage 320 which is positioned further away than the primary memory 310 and stores data in a non-volatile manner (e.g., also see the persistent storage 38 in FIG. 1).

As shown in FIG. 3, the secondary storage 320 stores data blocks 330 which are accessible via one or more datasets 332 (illustrated by the arrow 334 in FIG. 3). Example datasets include logical units of storage (LUNs), virtual volumes, files, file systems, etc. which are backed by block storage.

As further shown in FIG. 3, the environment 300 includes a de-duplication index 340 (also see the de-duplication index 60 in FIG. 1) having index segments . . . , 350(n−2), 350(n−1), 350(n), 350(n+1), . . . (collectively, segments 350). The segments 350 include block entries 360 that individually reference the blocks of data 330 (also see the block entries 48 in FIG. 1).

As shown, the segments 350 reside in the secondary storage 320, and the most popular (e.g., the highest ranked 100 segments 320) are loaded from the secondary storage 320 into the primary memory 310 to facilitate de-duplication. Such popularity may be based on values within hit/miss counters (e.g., see the counters 58 in FIG. 1). When a segment 350 is currently loaded into the primary memory 310 from the secondary storage 320 because it is one of the most popular, that segment 350 is referred to as a "resident" segment because that segment 350 now resides in the primary memory 310 for de-duplication purposes. However, if a segment 350 is not currently loaded into the primary memory 310 because it is not one of the most popular, that segment 350 is referred to as a "non-resident" segment because that segment 350 does not reside in the primary memory 310 for de-duplication purposes but simply resides in the secondary storage 320.

As further shown in FIG. 3 and by way of example, the index segments 350(n−1) and 350(n) are considered resident segments because they currently reside in the primary memory 310 for use in de-duplication (index segments 350(n−1) and 350(n) are shown in phantom within the secondary storage 320 because they were loaded into the primary memory 310 from the secondary storage 320). However, the index segments 350(n−2) and 350(n+1) are considered non-resident segments because they do not currently reside in the primary memory 310 for use in de-duplication.

Additionally, the segment 350(0) is considered the "open" segment because it is newly created and is currently in the process of being filled with references to data blocks 330. To this end, the segment 350(0) is not shown as residing in the secondary storage 320 because it may not yet have been synchronized to the secondary storage 320. In some arrangements, the current open segment 350 is not synchronized from the primary memory 310 to the secondary storage 320 until that segment 350 becomes filled with references 360 and is closed and a new open segment is created in its place.

At this point, one should appreciate that duplicate references 360 may exist among the de-duplication index 60 (e.g., see shaded objects within FIG. 3). For example, suppose that, while the segment 350(n−2) is the current open segment, a first copy 330(1) of particular block of data is written to the environment 300. In this situation, a reference 360(1) to the first copy 330(1) is added to the segment 350(n−2). Eventually, the segment 350(n−2) is filled and closed and written out from the primary memory 310 to the secondary storage 320 (i.e., synchronized) and a new open segment is created. Later, suppose that the segment 350(n−2) is displaced from the primary memory 310 because it is no longer considered popular enough to remain in the primary memory 310.

Now, suppose that, while the segment 350(n) is the current open segment, a second copy 330(2) of the same particular block of data is written to the environment 300. Since the segment 350(n−2) is no longer in the primary memory 310 for de-duplication purposes, a reference 360(2) to the second copy 330(2) is added to the current open segment, e.g., segment 350(n). At this point, the de-duplication index 340 now contains references 360 to separate copies 330 of the same particular block of data, i.e., a reference 360(1) to copy 330(1) and a reference 360(2) to copy 330(2). Such references 360(1), 360(2) are essentially duplicates. Eventually, the segment 350(n) may be filled and closed and synchronized to the secondary storage 320 and a new open segment may be created.

In accordance with certain embodiments, a reconciliation service 370 may operate to cleanup multiple references 360 to the same data block within the de-duplication index 340. Such a reconciliation service 370 may run in the background (e.g., as an off-line background process at a lower priority than other operations such as servicing I/O requests from one or more host computers).

In particular, the reconciliation service 370 iterates over the non-resident segments 350 of the de-duplication index 340 and validates each of the references 360 against those of the resident segments 350. Such operation thus reconciles location information for duplicates. Specifically, in the case of an "open" segment, the reconciliation service 370 removes the duplicating reference 360 altogether. However, in the case of a resident but not open segment 350, the reconciliation service 370 updates the reference 360 in the non-resident segment 350 to match the reference 360 of the resident segment 350. Further details will be provided with reference to FIGS. 4 and 5.

Figure 4:
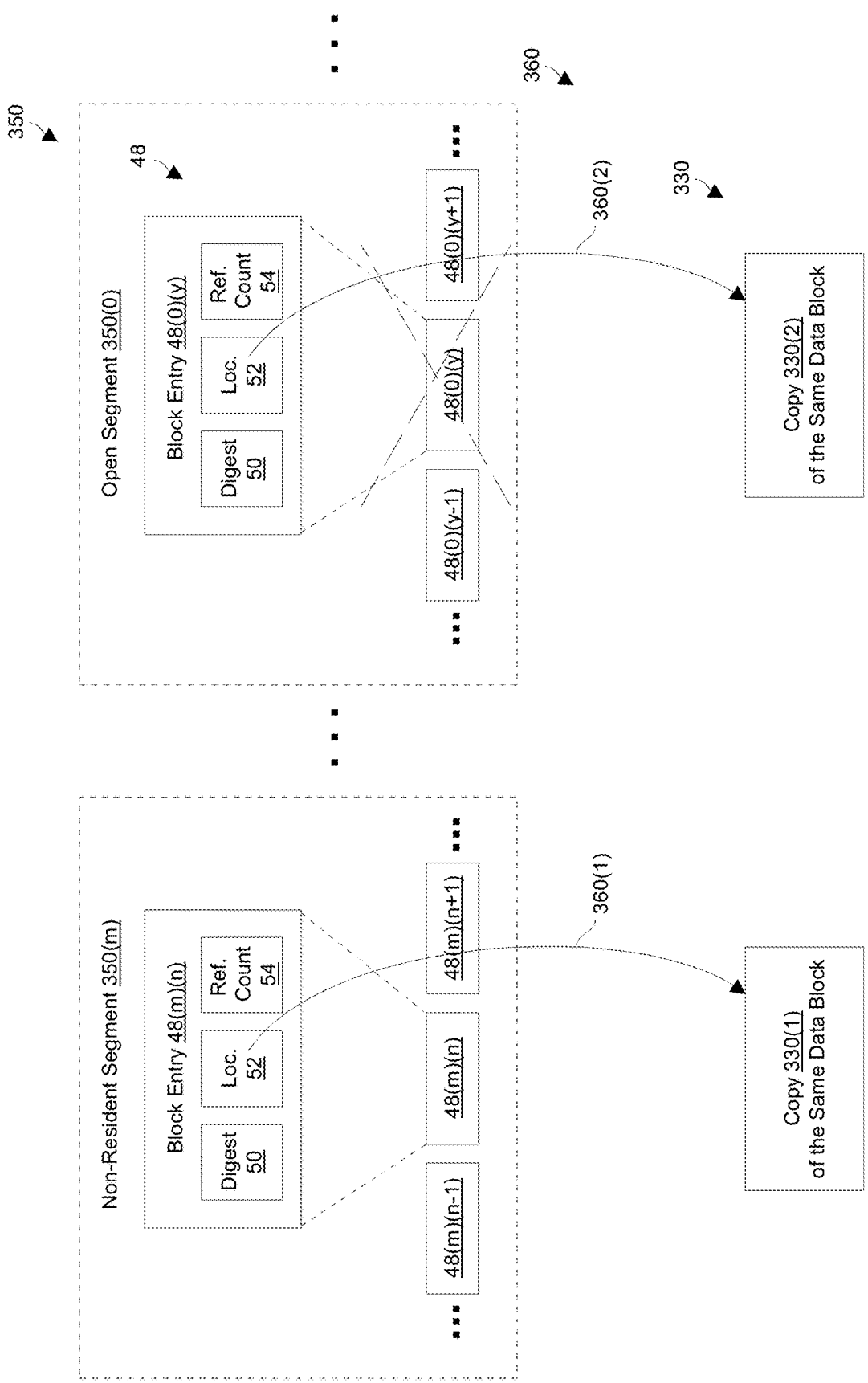
FIG. 4 is a block diagram of particular details of a reconciliation operation in accordance with certain embodiments.
Figure 5:
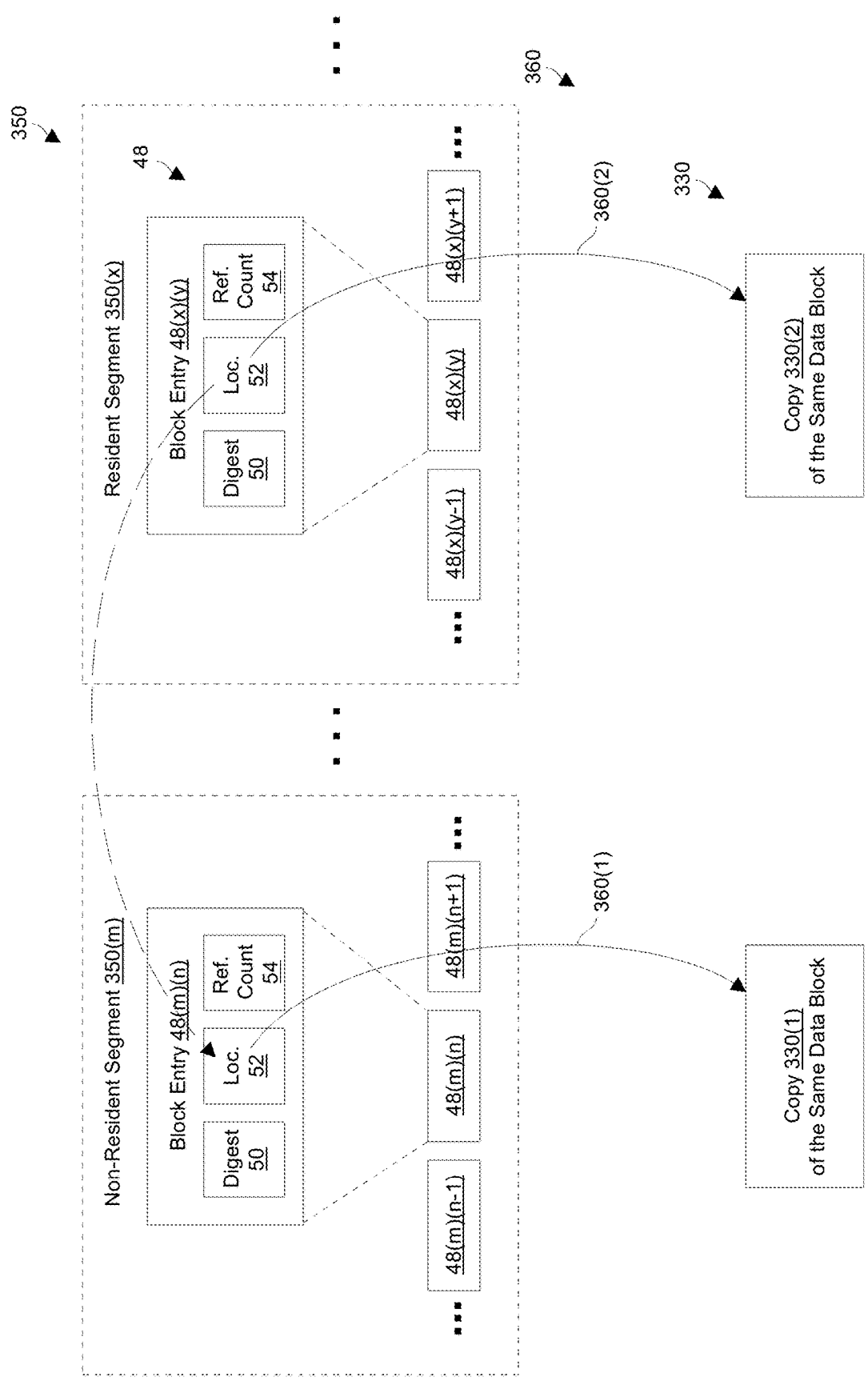
FIG. 5 is a block diagram of additional details of the reconciliation operation in accordance with certain embodiments.

FIGS. 4 and 5 show operation details provided by the reconciliation service 370 (FIG. 3) in accordance with certain embodiments. FIG. 4 shows processing details in the case of an open segment. FIG. 5 shows processing details in the case of a resident segment that is not the open segment.

As shown in both FIGS. 4 and 5, the index segments 350 include block (or digest) entries 48 which reference data blocks 330 stored in the secondary storage 320. Recall that each block entry 48 was earlier-explained to include a variety of data items such as a hash (or digest) 50, a location pointer 52, and a reference count 54 (also see FIG. 1).

With reference now to FIG. 4, suppose that the reconciliation service 370 discovers that a non-resident segment 350(m) and the open segment 350(0) contain references 360 to the same block of data 330. That is, the non-resident segment 350(m) includes a block entry 48(m)(n) having a location pointer 52 (i.e., a reference 360(1)) that identifies a first copy 330(1) of a particular data block. Likewise, the open segment 350(0) includes a block entry 48(0)(v) having a location pointer 52 (i.e., a reference 360(2)) that identifies a second copy 330(2) of the same particular data block. Such a determination may be made by the reconciliation service 370 by matching the digests 50 of the block entries 48.

To facilitate such matching and in accordance with some embodiments, the reconciliation service 370 may filter each digest 50 of the non-resident segment 350 against the predictive filters 56 of the segments 350 in the primary memory 310 in the same manner as that used during the earlier-described inline de-duplication process (also see FIG. 1). As shown in FIG. 4, the reconciliation service 370 discovers that the digest 50 of the digest entry 48(m)(n) of the non-resident segment 350(m) and the digest 50 of the digest entry 48(0)(v) of the open segment 350(0) are duplicates. In this situation, the reconciliation service 370 deletes the block entry 48(0)(v) from the open segment 350(0) (illustrated by the dashed "X" in FIG. 4). As a result, the non-resident segment 350(m) and the open segment 350(0) now conform in that there is only one reference 360 to one copy 330 of the data block, i.e., the reference 360(1) to the copy 330(1) of the data block.

However and with reference now to FIG. 5, suppose that the reconciliation service 370 discovers that a non-resident segment 350(m) and the resident segment 350(x) contain references 360 to the same block of data 330, where the resident segment 35(x) is not the open segment. That is, the non-resident segment 350(m) includes a block entry 48(m)(n) having a location pointer 52 (i.e., a reference 360(1)) that identifies a first copy 330(1) of a particular data block and, similarly, the resident segment 350(x) includes a block entry 48(x)(y) having a location pointer 52 (i.e., a reference 360(2)) that identifies a second copy 330(2) of the same particular data block. Again, such a determination may be made by the reconciliation service 370 by matching the digests 50 of the block entries 48.

As shown in FIG. 5, when the reconciliation service 370 discovers that the digest 50 of the digest entry 48(m)(n) of the non-resident segment 350(m) and the digest 50 of the digest entry 48(x)(y) of the resident segment 350(x) are duplicates, the reconciliation service 370 updates the reference 360(1) of the non-resident segment 350(m) to match the reference 360(2) of the resident segment 350(x). That is, the reconciliation service 370 replaces the location pointer 52 within the block entry 48(m)(n) of the non-resident segment 350(m) with the same location pointer 52 from the block entry 48(x)(y) of the resident segment 350(x) (illustrated by the dashed arrow in FIG. 5). As a result, the non-resident segment 350(m) and the resident segment 350(x) now conform in that both block entries 48(m)(n), 48(x)(y) reference one copy 330 of the data block, i.e., both use the reference 360(1) to identify the copy 330(1) of the data block. Further details will now be provided with reference to FIG. 6.

Figure 6:
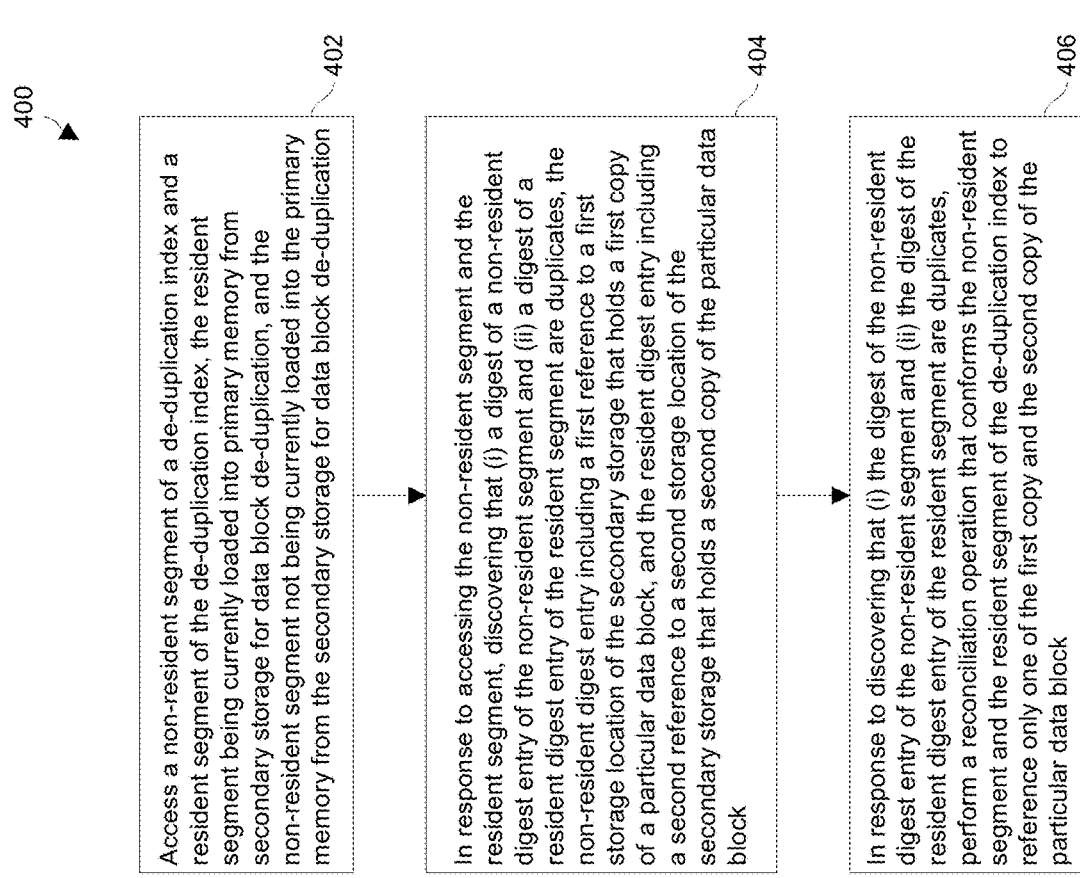
FIG. 6 is a flowchart of a procedure which is performed by circuitry of FIG. 1 in accordance with certain embodiments.

FIG. 6 is a flowchart of a procedure 400 which is performed by specialized circuitry to manage a de-duplication index having segments containing digest entries that reference data blocks residing within secondary storage.

At 402, the specialized circuitry accesses a non-resident segment of the de-duplication index and a resident segment of the de-duplication index (also see FIGS. 3 through 5). The resident segment is currently loaded into primary memory from the secondary storage for data block de-duplication, and the non-resident segment is not currently loaded into the primary memory from the secondary storage for data block de-duplication (FIG. 3).

At 402, the specialized circuitry, in response to accessing the non-resident segment and the resident segment, discovers that (i) a digest of a non-resident digest (or block) entry of the non-resident segment and (ii) a digest of a resident digest entry of the resident segment are duplicates (FIGS. 4 and 5). The non-resident digest entry includes a first reference to a first storage location of the secondary storage that holds a first copy of a particular data block, and the resident digest entry including a second reference to a second storage location of the secondary storage that holds a second copy of the particular data block.

At 404, the specialized circuitry, in response to discovering that (i) the digest of a non-resident digest entry of the non-resident segment and (ii) the digest of a resident digest entry of the resident segment are duplicates, performs a reconciliation operation that conforms the non-resident segment and the resident segment of the de-duplication index to reference just one of the first copy and the second copy of the particular data block (FIGS. 4 and 5).

One will appreciate that it is possible that there are multiple hits (as there are multiple resident segments 350). To identify which hit should be used to get the addressing information (i.e., reference 360), stream pattern detection may be applied. In some embodiments, the digests 50 are sampled using a bit mask and, once all the corresponding bits are set in a digest 50, it is considered consider to be an anchor (or reset). The reference counters are calculated for all resident segments between anchors (or resets) and those with the highest count are used to get the addressing information in the case of the multiple hits.

In certain embodiments, the reconciliation service 370 uses a predefined mask. For example, the reconciliation service 370 may use 0x10101010) where 4 bits are set so that every 16th digest on average operates as a trigger (where the bits of the digest fit the set bits of the mask). If the digest for the incoming block fulfills the mask, the digest is considered and anchor and specialized counters for the resident segments are initialized. Then, for each incoming digest, while there is no "new" anchor (because the incoming digests do not fulfill the mask, the specialized counters are incremented for each resident segment containing that incoming digest. Eventually, an incoming digest fulfills the mask and is deemed a new anchor and, at that time, the resident segment with the highest specialized counter is considered the "winning" resident segment from which to take the reference. Accordingly, the reconciliation service 370 replaces the reference of the non-resident segment with the reference from that "winning" resident segment.

As explained above, a number of missed duplicates may occur during operation. The reconciliation service 370 iterates over non-resident segments 350 and validates each of the digest 50 against the digests 50 in the resident segments 350 thus reconciling the location information for duplicates. In case of an "open" segment, the reconciliation service 370 removes the duplicating block/digest entry from the "open" segment. Otherwise, the reconciliation service 370 updates the location information in the "non-resident" segment to match the resident segment.

In some embodiments, if a back reference from a data block to its containing dataset 332 (FIG. 3) is supported, the older duplicated block 330 can also be replaced by a reference to a "newer" block 330. Here, the old data block copy 330 may be immediately deleted or left in place until it is eventually deleted as part of another operation (either re-written with a new content in the dataset(s) 332 that contain(s) it, or as a part of a deleted dataset 332). Note that in either case no update to the predictive filters 56 (FIG. 1) is necessary.

Finally, deletion of the blocks 330 may happen either as a result of a write-over, or deletion of a dataset 332. Such operation may be performed by a variety of services such as the reconciliation service 370 that updates the index segment(s) 350.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

It should be understood that all embodiments which have been described may be combined in all possible combinations with each other, except to the extent that such combinations have been explicitly excluded.

Finally, even if a technique, method, apparatus, or other concept is specifically labeled as "background" or "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

One should appreciate that the above-described techniques do not merely delete or de-duplicate data. Rather, the disclosed techniques involve improvements to the technology. With the techniques disclosed herein, advantages are available as well such as providing consistency and conformity within a deduplication index, reclaiming extraneously consumed storage space, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. In data storage equipment, a method of managing a de-duplication index having segments containing digest entries that reference data blocks residing within secondary storage, the method comprising:
   accessing a non-resident segment of the de-duplication index and a resident segment of the de-duplication index, the resident segment being currently loaded into primary memory from the secondary storage for data block de-duplication, and the non-resident segment not being currently loaded into the primary memory from the secondary storage for data block de-duplication;
   in response to accessing the non-resident segment and the resident segment, discovering that (i) a digest of a non-resident digest entry of the non-resident segment and (ii) a digest of a resident digest entry of the resident segment are duplicates, the non-resident digest entry including a first reference to a first storage location of the secondary storage that holds a first copy of a particular data block, and the resident digest entry including a second reference to a second storage location of the secondary storage that holds a second copy of the particular data block; and
   in response to discovering that (i) the digest of the non-resident digest entry of the non-resident segment and (ii) the digest of the resident digest entry of the resident segment are duplicates, performing a reconciliation operation that conforms the non-resident segment and the resident segment of the de-duplication index to reference only one of the first copy and the second copy of the particular data block;
   wherein performing the reconciliation operation includes:
      from the de-duplication index, eliminating one of the first reference to the first storage location of the secondary storage and the second reference to the second storage location of the secondary storage;
   wherein the method further comprises:
      prior to performing the reconciliation operation, performing a resident segment evaluation operation to determine whether the resident segment is open to receiving new digest entries or not open to receiving new digest entries;
   wherein eliminating includes:
      deleting the resident digest entry from the resident segment when a result of the resident segment evaluation operation indicates that the resident segment is open to receiving new digest entries, and
      replacing, within the non-resident digest entry, the first reference to the first storage location with the second reference to the second storage location when the result of the resident segment evaluation operation indicates that the resident segment is not open to receiving new digest entries.

2. A method as in claim 1 wherein discovering includes:
   performing a comparison operation between the digest of a non-resident digest entry of the non-resident segment and the digest of a resident digest entry of the resident segment to determine whether the digests are duplicates.

3. A method as in claim 2, further comprising:
prior to performing the comparison operation between the digest of the non-resident digest entry of the non-resident segment and the digest of the resident digest entry of the resident segment, filtering the digest of the non-resident digest entry against a predictive filter to predict whether the resident segment indexes a copy of the particular data block.

4. A method as in claim 1 wherein the data storage equipment is operative to perform data storage operations to write data to and read data from the secondary storage via datasets; and
wherein the method further comprises:
performing a de-duplication operation that shares one of the first copy and the second copy of the particular data block among different datasets.

5. A method as in claim 4 wherein initially a first dataset includes the first reference to the first storage location of the secondary storage that holds the first copy of the particular data block;
wherein initially a second dataset includes the second reference to the second storage location of the secondary storage that holds the second copy of the particular data block;
wherein performing the de-duplication operation includes:
accessing a back reference of the first copy of the particular data block to identify the first dataset among the dataset, and
upon identifying the first dataset, replacing the first reference with the second reference within the first dataset to share the second copy of the particular data block among both the first dataset and the second dataset.

6. A method as in claim 5 wherein performing the de-duplication operation further includes:
in response to replacing the first reference with the second reference within the first dataset, deleting the first copy of the particular data block from the secondary storage to reclaim memory space within the secondary storage.

7. A method as in claim 5, further comprising:
in response to replacing the first reference with the second reference within the first dataset, leaving the first copy of the particular data block in place until the first copy of the particular data block is rewritten with new dataset content.

8. A method as in claim 5, further comprising:
in response to replacing the first reference with the second reference within the first dataset, leaving the first copy of the particular data block in place until the first copy of the particular data block is deleted in response to dataset deletion.

9. In data storage equipment, a method of managing a de duplication index having segments containing digest entries that reference data blocks residing within secondary storage, the method comprising:
accessing a non-resident segment of the de-duplication index and a resident segment of the de-duplication index, the resident segment being currently loaded into primary memory from the secondary storage for data block de-duplication, and the non-resident segment not being currently loaded into the primary memory from the secondary storage for data block de-duplication;
in response to accessing the non-resident segment and the resident segment, discovering that (i) a digest of a non-resident digest entry of the non resident segment and (ii) a digest of a resident digest entry of the resident segment are duplicates, the non-resident digest entry including a first reference to a first storage location of the secondary storage that holds a first copy of a particular data block, and the resident digest entry including a second reference to a second storage location of the secondary storage that holds a second copy of the particular data block; and
in response to discovering that (i) the digest of the non-resident digest entry of the non resident segment and (ii) the digest of the resident digest entry of the resident segment are duplicates, performing a reconciliation operation that conforms the non-resident segment and the resident segment of the de-duplication index to reference only one of the first copy and the second copy of the particular data block;
wherein performing the reconciliation operation includes:
from the de-duplication index, eliminating one of the first reference to the first storage location of the secondary storage and the second reference to the second storage location of the secondary storage;
wherein the method further comprises:
prior to performing the reconciliation operation, performing a resident segment evaluation operation to determine whether the resident segment is open to receiving new digest entries or not open to receiving new digest entries;
wherein a result of the resident segment evaluation operation indicates that the resident segment is open to receiving new digest entries; and
wherein eliminating includes:
in response to the result of the resident segment evaluation operation indicating that the resident segment is open to receiving new digest entries, deleting the resident digest entry from the resident segment.

10. A method as in claim 9 wherein the data storage equipment is operative to perform data storage operations to write data to and read data from the secondary storage via datasets; and
wherein the method further comprises:
performing a de-duplication operation that shares one of the first copy and the second copy of the particular data block among different datasets.

11. A method as in claim 10 wherein initially a first dataset includes the first reference to the first storage location of the secondary storage that holds the first copy of the particular data block;
wherein initially a second dataset includes the second reference to the second storage location of the secondary storage that holds the second copy of the particular data block;
wherein performing the de-duplication operation includes:
accessing a back reference of the first copy of the particular data block to identify the first dataset among the dataset, and
upon identifying the first dataset, replacing the first reference with the second reference within the first dataset to share the second copy of the particular data block among both the first dataset and the second dataset.

12. In data storage equipment, a method of managing a de duplication index having segments containing digest entries that reference data blocks residing within secondary storage, the method comprising:
accessing a non-resident segment of the de-duplication index and a resident segment of the de-duplication index, the resident segment being currently loaded into primary memory from the secondary storage for data block de-duplication, and the non-resident segment not being currently loaded into the primary memory from the secondary storage for data block de-duplication;

in response to accessing the non-resident segment and the resident segment, discovering that (i) a digest of a non-resident digest entry of the non resident segment and (ii) a digest of a resident digest entry of the resident segment are duplicates, the non-resident digest entry including a first reference to a first storage location of the secondary storage that holds a first copy of a particular data block, and the resident digest entry including a second reference to a second storage location of the secondary storage that holds a second copy of the particular data block; and in response to discovering that (i) the digest of the non-resident digest entry of the non resident segment and (ii) the digest of the resident digest entry of the resident segment are duplicates, performing a reconciliation operation that conforms the non-resident segment and the resident segment of the de-duplication index to reference only one of the first copy and the second copy of the particular data block;

wherein performing the reconciliation operation includes:
from the de-duplication index, eliminating one of the first reference to the first storage location of the secondary storage and the second reference to the second storage location of the secondary storage;

wherein the method further comprises:
prior to performing the reconciliation operation, performing a resident segment evaluation operation to determine whether the resident segment is open to receiving new digest entries or not open to receiving new digest entries;

wherein a result of the resident segment evaluation operation indicates that the resident segment is not open to receiving new digest entries; and wherein eliminating includes:
in response to the result of the resident segment evaluation operation indicating that the resident segment is not open to receiving new digest entries, replacing the first reference to the first storage location with the second reference to the second storage location within the non-resident digest entry.

13. A method as in claim 12 wherein the data storage equipment is operative to perform data storage operations to write data to and read data from the secondary storage via datasets; and wherein the method further comprises:
performing a de-duplication operation that shares one of the first copy and the second copy of the particular data block among different datasets.

14. A method as in claim 13 wherein initially a first dataset includes the first reference to the first storage location of the secondary storage that holds the first copy of the particular data block;

wherein initially a second dataset includes the second reference to the second storage location of the secondary storage that holds the second copy of the particular data block;

wherein performing the de-duplication operation includes:
accessing a back reference of the first copy of the particular data block to identify the first dataset among the dataset, and
upon identifying the first dataset, replacing the first reference with the second reference within the first dataset to share the second copy of the particular data block among both the first dataset and the second dataset.

15. In data storage equipment, a method of managing a de duplication index having segments containing digest entries that reference data blocks residing within secondary storage, the method comprising:

accessing a non-resident segment of the de-duplication index and a resident segment of the de-duplication index, the resident segment being currently loaded into primary memory from the secondary storage for data block de-duplication, and the non-resident segment not being currently loaded into the primary memory from the secondary storage for data block de-duplication;

in response to accessing the non-resident segment and the resident segment, discovering that (i) a digest of a non-resident digest entry of the non resident segment and (ii) a digest of a resident digest entry of the resident segment are duplicates, the non-resident digest entry including a first reference to a first storage location of the secondary storage that holds a first copy of a particular data block, and the resident digest entry including a second reference to a second storage location of the secondary storage that holds a second copy of the particular data block; and in response to discovering that (i) the digest of the non-resident digest entry of the non resident segment and (ii) the digest of the resident digest entry of the resident segment are duplicates, performing a reconciliation operation that conforms the non-resident segment and the resident segment of the de-duplication index to reference only one of the first copy and the second copy of the particular data block;

wherein (i) the digest of the non-resident digest entry of the non-resident segment and (ii) the digests of resident digest entries of multiple resident segments are discovered to be duplicates; and wherein performing the reconciliation operation includes:
choosing, as the resident segment, a particular segment from among the multiple resident segments of the deduplication index, and
in response to choosing the particular segment from among the multiple resident segments of the deduplication index, conforming the non-resident segment and the particular segment of the deduplication index to reference only one of the first copy and the second copy of the particular data block.

16. A method as in claim 15 wherein choosing the particular segment includes:
performing a stream pattern detection operation that selects the particular segment from among the multiple resident segments of the deduplication index.

17. Data storage equipment, comprising:
memory; and
control circuitry coupled to the memory, the memory storing instructions which, when carried out by the control circuitry, cause the control circuitry to:
access a non-resident segment of a de-duplication index and a resident segment of the de-duplication index, the resident segment being currently loaded into primary storage from secondary storage for data block de-duplication, and the non-resident segment not being currently loaded into the primary storage from the secondary storage for data block de-duplication,
in response to accessing the non-resident segment and the resident segment, discover that (i) a digest of a non-resident digest entry of the non-resident segment and (ii) a digest of a resident digest entry of the resident segment are duplicates, the non-resident digest entry including a first reference to a first storage location of the secondary storage that holds a first copy of a particular data block, and the resident digest entry including a second reference to a second storage location of the secondary storage that holds a second copy of the particular data block, and in response to discovering that (i) the digest of the non-resident digest entry of the non-resident segment and (ii) the digest of the resident digest entry of the resident segment are duplicates, perform a reconciliation operation that conforms the non-resident segment and the resident segment of the de-duplication index to reference only one of the first copy and the second copy of the particular data block;

wherein the control circuitry, when performing the reconciliation operation, is constructed and arranged to:
from the de-duplication index, eliminate one of the first reference to the first storage location of the secondary storage and the second reference to the second storage location of the secondary storage;

wherein the control circuitry is further constructed and arranged to:
prior to performing the reconciliation operation, perform a resident segment evaluation operation to determine whether the resident segment is open to receiving new digest entries or not open to receiving new digest entries;

wherein the control circuitry, when eliminating, is constructed and arranged to:
delete the resident digest entry from the resident segment when a result of the resident segment evaluation operation indicates that the resident segment is open to receiving new digest entries, and
replace, within the non-resident digest entry, the first reference to the first storage location with the second reference to the second storage location when the result of the resident segment evaluation operation indicates that the resident segment is not open to receiving new digest entries.

18. Data storage equipment as in claim 17 wherein the data storage equipment is operative to perform data storage operations to write data to and read data from the secondary storage via datasets; and
wherein the control circuitry is further constructed and arranged to:
perform a de-duplication operation that shares one of the first copy and the second copy of the particular data block among different datasets.

19. A computer program product having a non-transitory computer readable medium which stores a set of instructions to manage a de-duplication index having segments containing digest entries that reference data blocks residing within secondary storage; the set of instructions, when carried out by computerized circuitry, causing the computerized circuitry to perform a method of:
accessing a first segment of the de-duplication index and a second segment of the de-duplication index, the second segment having already been loaded into primary storage from the secondary storage for data block de-duplication, and the first segment not having already been loaded into the primary storage from the secondary storage for data block de-duplication;
in response to accessing the first segment and the second segment, discovering that (i) a digest of a digest entry of the first segment and (ii) a digest of a second digest entry of the second segment are duplicates, the first digest entry including a first reference to a first storage location of the secondary storage that holds a first copy of a particular data block, and the second digest entry including a second reference to a second storage location of the secondary storage that holds a second copy of the particular data block; and
in response to discovering that (i) the digest of the first digest entry of the first segment and (ii) the digest of the second digest entry of the second segment are duplicates, performing a reconciliation operation that conforms the first segment and the second segment of the de-duplication index to reference only one of the first copy and the second copy of the particular data block;
wherein performing the reconciliation operation includes:
from the de-duplication index, eliminating one of the first reference to the first storage location of the secondary storage and the second reference to the second storage location of the secondary storage;
wherein the method further comprises:
prior to performing the reconciliation operation, performing a resident segment evaluation operation to determine whether the resident segment is open to receiving new digest entries or not open to receiving new digest entries;
wherein eliminating includes:
deleting the resident digest entry from the resident segment when a result of the resident segment evaluation operation indicates that the resident segment is open to receiving new digest entries, and
replacing, within the non-resident digest entry, the first reference to the first storage location with the second reference to the second storage location when the result of the resident segment evaluation operation indicates that the resident segment is not open to receiving new digest entries.

20. A computer program product as in claim 19 wherein the computerized circuitry is operative to perform data storage operations to write data to and read data from the secondary storage via datasets; and
wherein the method further comprises:
performing a de-duplication operation that shares one of the first copy and the second copy of the particular data block among different datasets.

* * * * *